INVENTOR
JEAN MAURICE
BY Young +Thompson
ATTYS.

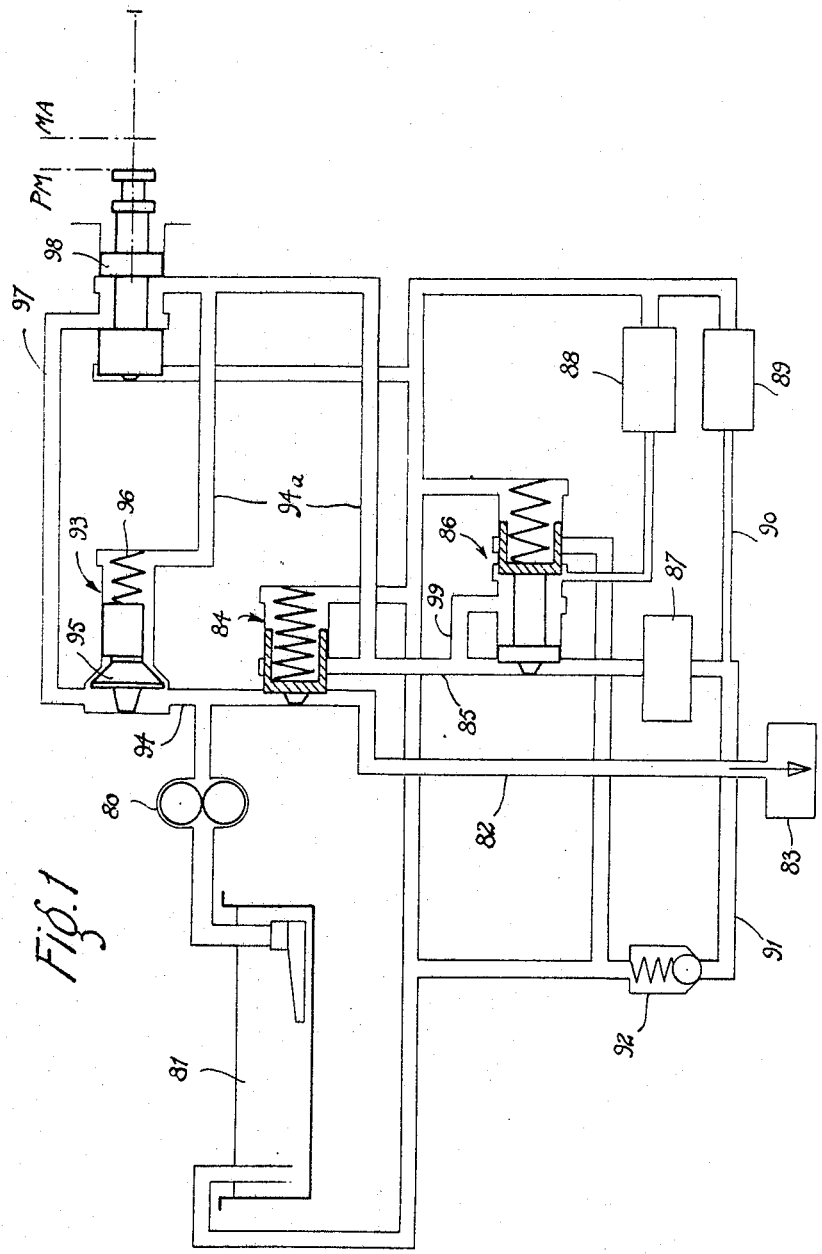

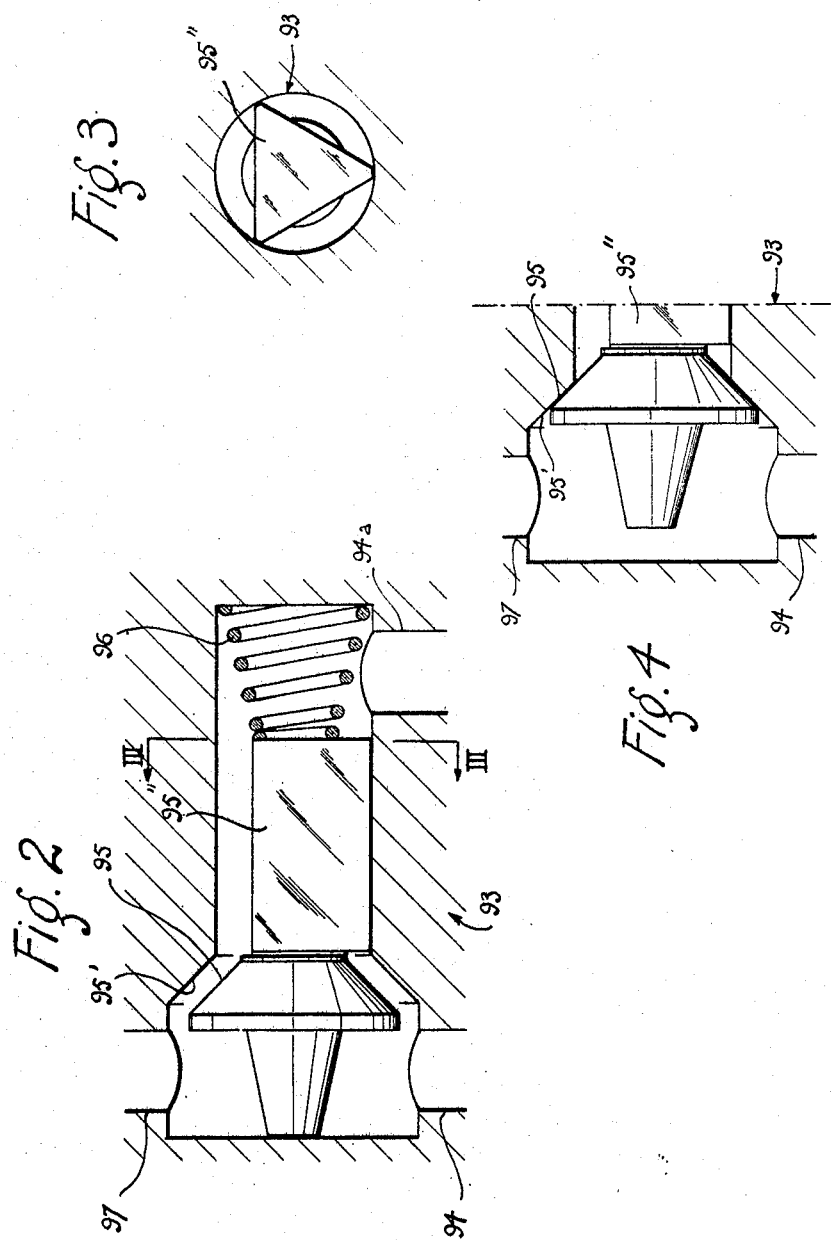

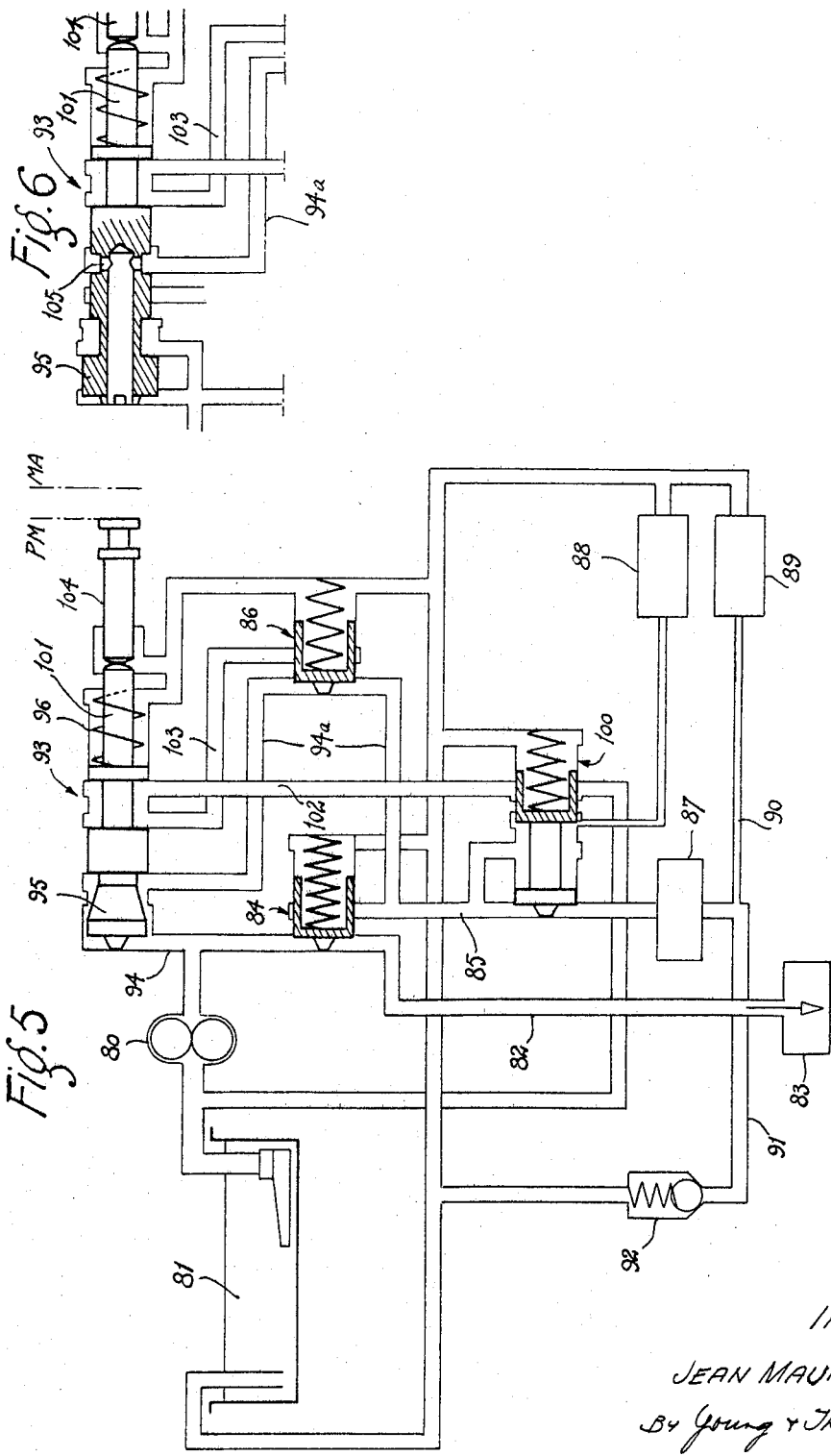

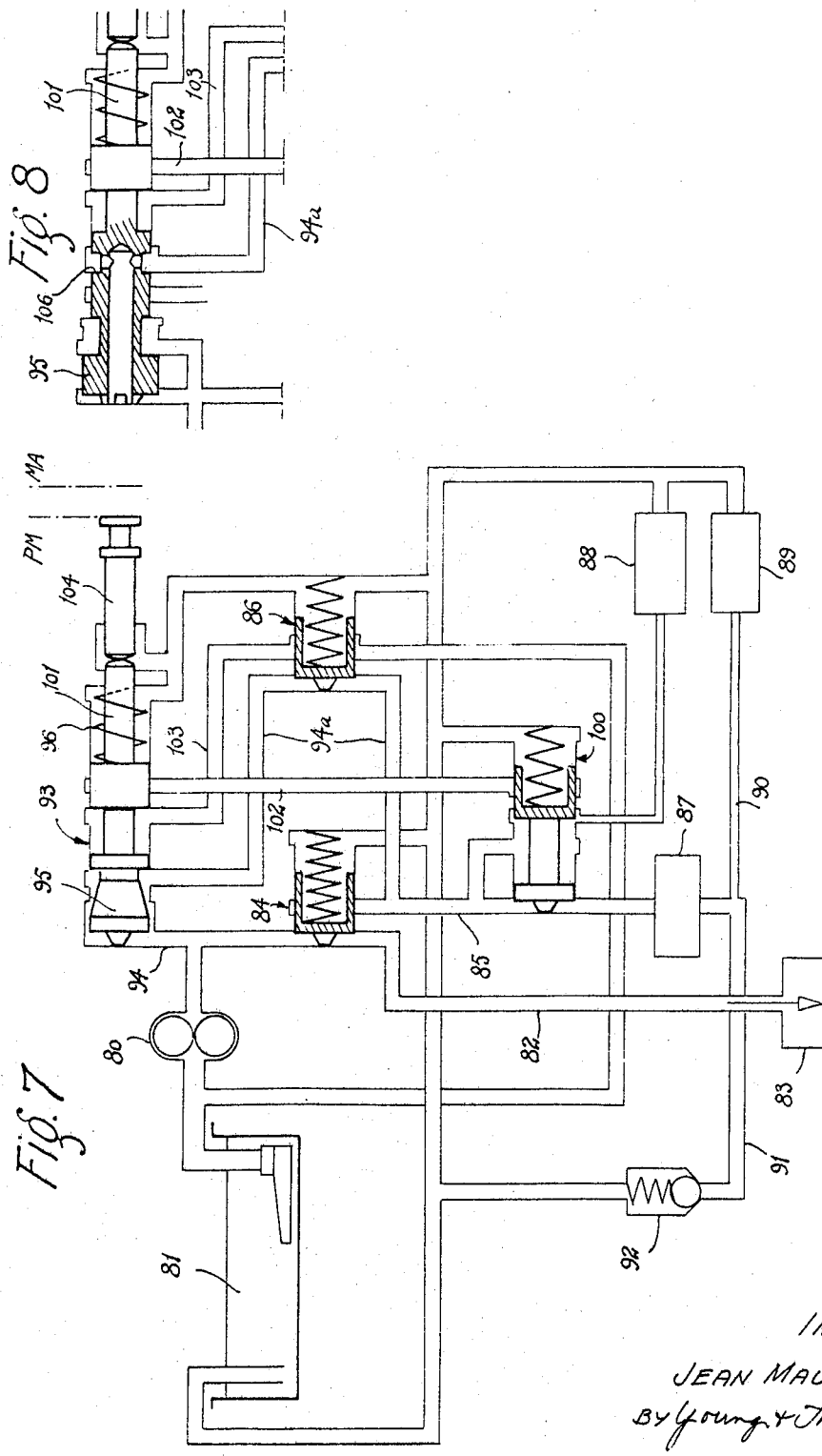

United States Patent Office 3,481,141
Patented Dec. 2, 1969

3,481,141
TRANSMISSION CONTROL ESPECIALLY FOR AN AUTOMOBILE VEHICLE
Jean Maurice, Paris, France, assignor to Societe Anonyme Francaise du Ferodo, Paris, France
Filed Mar. 21, 1968, Ser. No. 715,028
Claims priority, application France, Mar. 24, 1967, 100,156; June 15, 1967, 110,477
Int. Cl. F16d *31/06, 23/10;* F16h *41/04*
U.S. Cl. 60—12                                            10 Claims

ABSTRACT OF THE DISCLOSURE

A transmission control system, especially for an automobile vehicle having an engine and a pump driven at a speed equal to or proportional to that of the engine, the system comprising a first pressure-level controlled in dependence on the delivery of the pump, a second pressure-level lower than the first, and an anti-shock clapper-valve interposed between the two pressure-levels, the anti-shock valve being urged towards closure by the difference in pressures on the upstream and downstream sides of the valve, acting in opposition to a spring urging the valve in the direction of opening, the spring defining a pressure-difference beyond which the valve is closed and up to which it is open. The output of the pump is such that, at the engine idling speed, the pressure-drop between the upstream and downstream sides of the anti-shock valve is insufficient to close the valve. The value of the critical pressure-difference corresponds to an engine speed slightly higher than the idling speed. The transmission further comprises pressure-actuated gripping and release means which are subjected to the first pressure-level when the engine is rotating at a speed higher than idling speed and are subjected to the said second pressure-level when the engine is rotating at idling speed and the anti-shock valve is open.

---

The present invention relates to controls of transmission, especially for automobile vehicles, and more particularly to transmissions of this kind comprising:

A random inertia in neutral gear transimtted at idling speed by the engine, for example the turbine of a hydraulic torque converter or a hydraulic coupler, or the driven potrion of a centrifugal clutch, or the like;

A hydraulic control, automatic or not, dependent on a manual control having at least two positions: a neutral position and a working position;

Friction members, clutches and/or brakes, permitting the engagement of gears and controlled in engagement by hydraulic pressure.

When these transmissions are fitted on an automobile vehicle, they have the disadvantage that engagement of a gear when stopped with the engine idling gives rise to a shock which is felt by the passengers and interferes with comfort. In the usual transmissions of this type, the fact of engaging a gear when stopped, gripping one or more friction members, has the result of associating the random inertia with the wheels of the vehicle and therefore of causing this inertia to be absorbed by the vehicle. In view of the fact that the clamping pressure of the said members is high, a shock results.

The present invention has for its object a transmission control, especially for automobile vehicles, which enables this disadvantage to be overcome.

According to the invention, a transmission control, especially for an automobile vehicle, having an engine and a pump driven at a speed equal or proportional that of the engine is characterized in that it comprises a first pressure level controlled in dependence on the delivery of the said pump, a second pressure level lower than the first, and an anti-shock clapper-valve interposed between the first and second pressure levels, the said valve being urged in the direction of closure by the difference in pressures on the upstream and downstream sides of the said valve in opposition to a spring which urges the said valve in the direction of opening and which is calibrated so as to define a value or threshold of difference in pressures beyond which the valve is closed and up to which the valve is open, the said pump having an output such that when the engine is idling, the pressure loss between the upstream and downstream sides of the anti-shock valve is insufficient to cause the closure of the anti-shock valve, the said value of difference in pressures corresponding to an engine speed slightly higher than the idling speed, the said transmission having hydraulic pressure-sensitive frictional means, whereby, when the engine rotates faster than idling speed and when the anti-shock valve is closed, the clamping and release means are permitted to be subjected to the first pressure level, while when the engine is at idling speed and the anti-shock valve is open, the clamping and release means are permitted to be subjected to the second pressure level.

By virtue of the anti-shock clapper-valve according to the invention, when a gear is engaged with the vehicle stationary, the corresponding friction member or members constituting the clamping and release means are applied under a reduced pressure with respect to the pressure at which they are in normal operation. The means for reducing the clamping pressure are constituted by the anti-shock clapper-valve. They are caused to come into action after the control has been put in the neutral position, and remain in action when the control has left the neutral position, as long as the speed of the engine has not exceeded a pre-determined value, slightly higher than idling speed.

More particularly, in a transmission which comprises: a fluid tank, a pump having its suction conduit coupled to the tank and in which the delivery conduit discharges, through the intermediary of a general regulation valve, into the utilization line which supplies the various devices permitting the engagement of different gears and, when so required, of regulation members, the general regulation valve being calibrated in such manner as normally to ensure a pressure in the utilization line. According to the invention, this pressure is reduced in the neutral position.

To this end, the anti-shock clapper-valve is mounted between the delivery of the pump provided with the general regulation valve and a zone of reduced pressure, the said anti-shock valve being reversed in operation with respect to the said general regulation valve, that is to say, the delivery pressure of the pump has a tendency to close it against a force such as the elastic action of the restoring spring. In order to ensure that this valve comes into action only in the neutral position, means are provided for keeping it open in the neutral position.

These means may be mechanical (for example a finger put in position at the neutral position by acting on the control prevents the valve from closing, and is retracted as soon as the control leaves the neutral position) or hydraulic, consisting for example of a slide-valve mounted on a hydraulic line coupling together the upstream and downstream sides of the clapper-valve, this slide-valve being actuated by the control in such manner that at the neutral position this hydraulic line is open and by-passes the anti-shock clapper-valve, a spring holding the said clapper-valve open.

Thus, at the neutral position, the utilization line and therefore the control chambers of the friction members, is the seat of a reduced pressure since it is in direct communication, through the open clapper-valve and the slide-valve, with the zone of reduced pressure.

The pressure-reducing means are preferably hydraulic and constituted by the said clapper-valve. When the user engages a gear, the control leaves the neutral position and the slide-valve closes the hydraulic line coupling the upstream and downstream sides of the anti-shock clapper-valve. The reduced pressure always exists in the utilization line, since the pressures are equal on each side of the clapper-valve, the pressure drop through the valve being negligible at idling speed, the restoring spring of the clapper-valve keeping this latter open.

It is under this reduced pressure that the friction members corresponding to the gear engaged are applied, and the random inertia is stopped without shock.

When the user accelerates, the output supplied by the pump increases and as all the output of the pump passes through the clapper-valve, when the drop in pressure through the anti-shock valve is sufficient to operate it, the latter closes, thus interrupting the communication between the utilization line and the reduced-pressure zone. From this moment onwards, it is the general regulation valve which comes into action and ensures the normal pressure in the utilization line; the friction members are gripped normally.

The reduced-pressure zone is preferably a conduit through which passes the fluid upstream of a clapper-valve known as a limiter valve, calibrated to a value less than that of the general regulation valve.

When the transmission comprises a hydraulic converter or coupler, it is preferable to maintain therein a relatively constant but not too high pressure in order to avoid swelling, and a continuous flow-rate for questions of cooling.

In one form of construction, the limiter valve also regulates the pressure of the converter, and in order to ensure a continuous flow the reduced-pressure zone is coupled to the discharge of the general regulation valve.

In an alternative form, the apparatus such as a converter is supplied by means of an additional valve at still another pressure which is appropriate to it.

The objects, characteristic features and advantages of the invention will be further brought out in the description which follows below of forms of embodiment chosen by way of example with reference to the accompanying drawings, in which:

FIG. 1 is a diagram of a hydraulic installation comprising the arrangement according to the invention, in which an anti-shock clapper-valve is provided, while a limiter valve also regulates the pressure of a converter.

FIG. 2 is a view on a larger scale of the anti-shock valve, this valve being shown in the open position;

FIG. 3 is a view of this clapper-valve in the direction of the arrows III—III of FIG. 2;

FIG. 4 is a partial view of the valve of FIG. 2, this valve being shown in the closed position;

FIG. 5 is a view similar to FIG. 1, but in which the pressure regulated by the limiter valve is lower than the pressure given by a valve associated with the converter;

FIG. 6 shows an alternative form of the anti-shock valve of FIG. 5, ensuring rapid closure by the effect of an adequate output from the pump;

FIG. 7 is a view similar to FIG. 1, but in which the pressure regulated by the limiter valve is higher than the pressure given by a valve associated with the converter;

FIG. 8 shows an alternative form of the anti-shock clapper-valve of FIG. 7, ensuring rapid closure by the effect of an adequate output from the pump;

Figure 9:
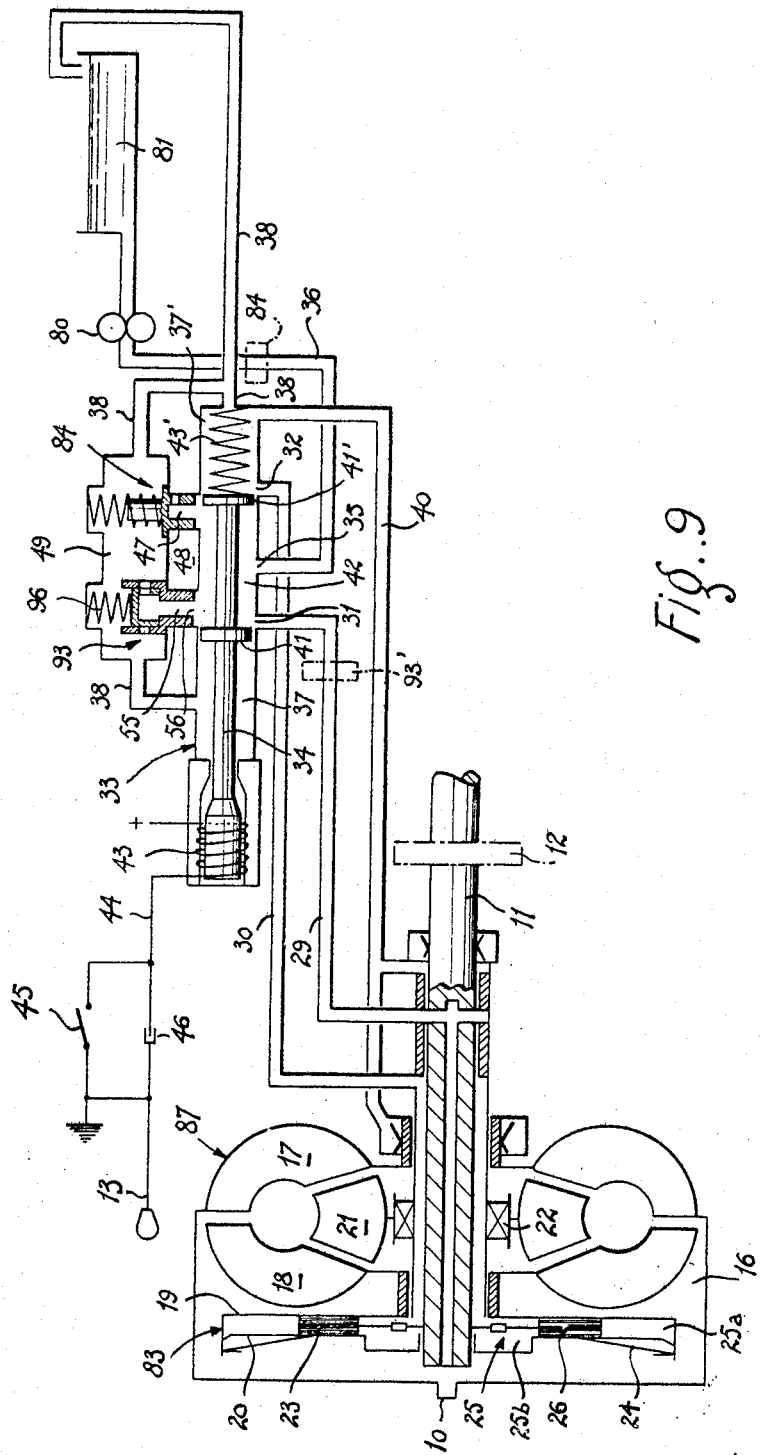

FIG. 9 relates to a further alternative form of transmission.

Reference will first be made to FIG. 1, which relates to a hydraulic installation associated with a transmission of an automobile vehicle. A pump 80 driven at a speed proportional to that of the engine takes-in fluid from a tank 81 and delivers it into a utilization line 82 which supplies pressure to various members shown diagrammatically at 83, permitting the engagement of the various gear ratios and, when so required, of the regulation devices. This supply is effected by means of a general regulation clapper-valve 84, calibrated to a value ensuring as a maximum a pressure $P_1$ in the line 82. The discharge of the valve 84 passes through a line 85 and supplies a hydraulic torque converter 87 at a pressure $P_0$ which is kept less than $P_1$ by means of a limiter valve 86.

The fluid at the pressure $P_0$ which supplies the hydraulic torque converter 87 ensures the lubrication of the parts to be lubricated shown diagrammatically at 88. Other parts shown diagrammatically at 89 may also be lubricated through a conduit 90 coupled to the outlet of the converter on the return line 91 to the tank 81, a lightly-calibrated clapper-valve 92 being placed for that purpose in line 91.

An anti-shock clapper-valve 93 is interposed in a line 94a, between the line 85 for the discharge of the general regulation valve 84 and the pump 80.

The anti-shock value 93 (FIGS. 1, 2, 3 and 4) comprises a conical head 95 co-operating with a conical seating 95' and a guided triangular rod 95". The conical head 95, forming a valve, is urged in the direction of opening by a spring 96 and towards closure by the delivery pressure at 94 of the pump 80, when this pressure is sufficient to compress the said spring. The upstream and downstream sides of the valve 93 are connected to each other by a line 97, in which is interposed a slide-valve 98 which is movable in association with a control. The slide-valve 98 can occupy two positions: a first position corresponding to the neutral position of the control indicated by PM, in which the line 97 is open; and a second position corresponding to any position of working of the control indicated by MA, in which the line 97 is closed.

The operation is as follows:

When the vehicle is stopped with the engine idling and the control in the neutral position, the pump 80 creates in the lines 82 and 85 a pressure $P_0$ regulated by the clapper-valve 86; in fact, the fluid delivered by the pump 80 passes through the line 97 and the valve 93 is held open by the fact of the equality of pressures on each side of this valve. When the user engages a gear to start-up, the slide-valve 98 closes the line 97; the pressure $P_0$ is still maintained due to the fact that the pump 80 delivers very little at idling speed, and therefore the loss of pressure across the valve 93 is insufficient to overcome the spring 96 of the valve 93. The friction members 83 supplied by the line 82 are applied with a moderate force and the resultant clutching takes place without shock.

When the user accelerates, the pressure drop across the valve 93 applies the valve 95 against its seating and the valve 93 is closed.

The pressure in the line 82 is regulated by the clapper-valve 84 and to the value $P_1$ of normal working pressure, while the converter 87 is the seat of a pressure $P_0$ regulated by the clapper-valve 86. The arrangement of the valve 86 combined with a line such as the line 99, permits a lubrication of the parts at 88 and 89, irrespective of the position and the state of the various valves.

The arrangement which has just been described with reference to FIG. 1 corresponds to the case in which the reduced pressure $P_0$ is compatible at the same time with the operation of the converter 87 and the anti-shock characteristic when stopped. If this were not the case, and according to a further characteristic feature of the invention, to the general regulation valve 84, to the limiter valve 86 and to the anti-shock clapper-valve 93 is added a fourth clapper-valve 100 (see FIG. 5) known as the converter valve, and regulating the pressure of this latter. The pressure $P_0$ regulated by the limiter valve 86 may be lower (see FIG. 5) or higher (see FIG. 7) than the pressure $P_2$ regulated by the converter valve 100, both being lower than the pressure $P_1$ regulated by the general regulation valve 84.

FIG. 5 corresponds to the case in which the pressure $P_0$ regulated by the limiter valve 86 is lower than the pressure $P_2$ regulated by the converter valve 100. There is again seen at 94a the line which is associated with the valve 93 and on which in this case the valve 86 providing the pressure $P_0$ is connected.

The anti-shock valve 93 comprises a slide-valve 101 which establishes, at the neutral point PM, a communication between the discharge line 102 of the valve 100 and the discharge line 103 of the valve 86. The finger 104 forms a mechanical member which keeps the valve 95 open at the neutral point PM.

When the vehicle is stopped with the engine idling and the control in the neutral position, the pump 80 creates in the lines 82, 94a and 85 a pressure $P_0$ regulated by the valve 86 which, amongst the valves 84, 86 and 100 in these lines, is the most lightly calibrated.

When the user engages a gear to start-up, the finger 104 comes into the position MA and frees the slide-valve 101 from the valve 93. The pressure $P_0$ is still maintained and the resultant clutching is effected without shock.

When the user accelerates, the pressure drop across the valve 93 applies the latter against its seating, thus closing the line 94a. Simultaneously, the slide-valve 101 has come into a position in which it closes the conduit 103 of the discharge of the valve 86, putting the latter out-of-action from then on. For this reason, the general valve 84 ensures the pressure $P_1$ in the line 82, while the valve 100 ensures the pressure $P_2$ in the converter 87.

In the alternative form shown in FIG. 6, the arrangement is the same as that of FIG. 5, but the anti-shock valve 93 has a modified construction, in which the pressure drop which governs the closure of the valve for a given value of the output of the pump corresponding to a speed of rotation of the engine, is defined by a nozzle 105 which permits of a more convenient construction.

Reference will now be made to FIG. 7, in which the arrangement is similar to that of FIG. 5, but which corresponds to the case where the pressure $P_0$ regulated by the limiter valve 86 is higher than the pressure $P_2$ given by the converter valve 100. The anti-shock valve 93 comprises a slide-valve 101 which in this case blocks, in the neutral position PM, the discharge conduit 102 of the converter valve 100, since this valve 100 is calibrated to the value $P_2$, in this case lower than $P_0$.

The alternative form shown in FIG. 8 relates to the construction of the anti-shock valve 93 which is similar to that shown in FIG. 6, but which is applied to the installation of FIG. 7. There will again be seen the nozzle, in this case having the reference 106, which makes it possible to obtain readily the pressure drop governing the closure of the valve for a given value of the output of the pump corresponding to a speed of rotation of the engine.

Reference will now be made to FIG. 9, which concerns a special application of the invention to the control of a transmission of an automobile vehicle comprising, between a driving shaft 10 and a driven shaft 11, on the one hand the hydraulic torque converter 87 and, on the other the clutch 83, which are in this case arranged in a chamber 16 filled with oil and fixed on the shaft 10.

The driven shaft 11 forms the input shaft of a gear-box 12, the selecter lever of which is shown at 13.

The hydraulic torque converter 87 comprises an impeller 17 coupled to the shaft 10, a turbine 18 coupled to a pair of plates 19 and 20 of the clutch 83, and a reactor 21 associated with a free-wheel 22.

The plates 19 and 20 of the clutch 83 are adapted to grip between them a friction disc 23 coupled to the shaft 11, and are acted upon by an elastic means, constituted for example by a Belleville washer 24 which tends to clamp them with a reduced force corresponding to about one-third of the maximum engine torque.

The plates 19 and 20 form a cylinder-piston system immersed in the oil of the chamber 16, which constitutes for them an external chamber, and they form between them an internal chamber 25. This chamber comprises the disc 23 and has a peripheral region 25a surrounding the linings of the disc 23, and a central region 25b surrounded by the said linings. The two regions 25a and 25b communicate with each other by controlled passage means 26 formed in the disc.

The clutch 83 is controlled in dependence on the pressures which are permitted to obtain respectively in the external chamber 16 and in the internal chamber 25.

The clutch 83 is engaged when the pressure in the chamber 16 is high, while the chamber 25 is put on discharge. The clutch 83 is disengaged when the pressure in the chamber 25 is high, while the chamber 16 is put on discharge.

The action of the elastic washer 24, which is sufficient to hold the vehicle when stopped under the effect of the engine compression, with the engine stopped and a gear engaged, is such that it is substantially overcome by the application of pressure to the chamber 25 for the purpose of de-clutching.

In the example shown in FIG. 9, the pressure level admitted to the chamber 16 for engagement and that admitted to the chamber 25 for de-clutching are the same, being determined by means of the calibrated discharge valve 84 which is associated with the pump 80.

The pump 80 takes in fluid from the tank 81 and is driven at a speed of rotation which is equal or proportional to that of the driving shaft 10.

A distributor constituted by an electro-valve 33 comprises a slide-valve 34 actuated by an electro-magnet 43 and an opposing spring 43', so as to be capable of taking-up one of two positions, known respectively as "engaged" (as shown in FIG. 9) and "de-clutched" (displaced towards the right of FIG. 9) with respect to the "engaged" position.

The slide-valve 34 comprises two bearing surfaces 41 and 41' which form between them a central pressure or supply space 42 which moves at the same time as the slide-valve, while on each side of the pistons 41 and 41' the electro-valve comprises two end-spaces 37 and 37' in communication with the tank 39.

The pump 80 is coupled by a delivery conduit 36 to an orifice 35 of the electro-valve which is in continuous communication with the central space 42. The end-spaces 37 and 37' are continuously connected by pipes 38 to the tank 39. There is shown at 40 a collector conduit for leakages from the joints of the converter, which is connected to the tank 21.

The chambers 16 and 25 of the clutch 83 are respectively connected by two conduits 29 and 30 to two orifices 31 and 32 of the electro-valve 33. In the "engaged" position of the slide-valve 34, the orifice 31 communicates with the central space 42, while the orifice 32 communicates with the ends-space 37' which puts the chamber 16 under pressure and the chamber 25 to the tank.

In the "de-clutched" position of the slide-valve 34, the orifice 31 communicates with the end-space 37, while the orifice 32 communicates with the central space 42, which puts the chamber 16 to the tank and the chamber 25 under pressure.

The electro-magnet 43 of the electro-valve 33 comprises a circuit 44 having two switches in parallel, one switch 45 being responsive to the condition that the box 12 is in neutral position, the other 46 being sensitive to the fact that the selector lever 13 is actuated to change the ratio of the box 12.

The electro-valve 33 is in the "engaged" position when the box 12 is no longer in the neutral position and when the lever 13 is not touched, and is in the "de-clutched" position if the box 12 is in the neutral position or if the lever 13 is grasped in order to engage a gear or to change gear.

The calibrated discharge valve 84 co-operates with a conduit 47 connected to the electro-valve 33 at 48 so as to be in continuous communication with the space 42, irrespective of the "engaged" or "de-clutched" position of the slide-valve 34. The valve 84 is permitted to deliver as soon as it is open, into the leakage chamber 49 coupled to the return piping 38 to the tank 81.

The clapper-valve 84 is calibrated by a spring which defines the regulation pressure, that is to say the maximum working pressure which the pump can develop in the space 42, and from thence into the conduit 29 when the slide-valve 33 is in the "engaged" position, and into the conduit 30 when the slide-valve 33 is in the "de-clutched" position.

The anti-shock valve 93 co-operates with a conduit 55 connected to the electro-valve 33 at 56 so as to be in communication with the space 42 only in the "engaged" position, while in the "de-clutched" position, the orifice 56 communicates with the space 37 coupled to the tank 39 by the piping 38.

The valve 93 is calibrated by the weak spring 96, for example of 700 grams, which holds it open when the pressure in the conduit 55 is less than the pre-determined threshold of low value. The valve 93 closes as soon as the pressure in the conduit 55 exceeds this threshold value.

The operation is as follows:

When the vehicle is in motion with the engine rotating, with a gear engaged while the user does not touch the lever 13, the electro-valve 33 is in the "engaged" position such as shown in FIG. 9. The pump 80 driven by the engine has an output sufficient for the anti-shock valve 93 to be closed and it is the valve 84 which regulates the pressure developed in the space 42 and from thence in the conduit 29, by maintaining this pressure. The clutch 83 is held engaged by the effect of this pressure, on which is superimposed the pre-determined moderate force of the elastic washer 24.

When under these conditions the user operates the lever 13 to change the ratio of the box 12, the electro-valve passes from the "engaged" position to the "de-clutched" position. The clapper-valve 93 is put out of action. The valve 82 still maintains the regulated pressure in the space 42. This pressure is in this case sent by the conduit 30 into the chamber 25, which releases the clutch 83 and permits the change of gear.

The clapper-valve 93 opens since the conduit 29 is coupled to the tank 39. When the new gear is engaged and the user releases the lever 13, the electro-valve moves back into the "engaged" position, which re-engages the clutch. The valve 93 re-closes because the vehicle is running and drives the engine at a speed higher than the idling speed, even if the user lifts his foot from the accelerator pedal, which gives the pump 80 a sufficient speed for the pressure at 42 to exceed the action of the weak spring 96 and this is all the more true if the user accelerates.

When the clapper-valve 84 is displaced at the moment of de-clutching, it causes a slight over-pressure at 49 which, since the space 37 is coupled to the tank 39, contributes by assisting the spring 96, which can be chosen very weak.

The valve 93 does not modify the conditions of operation of the valve 84 when the vehicle is running, but the clapper-valve 93 acts to improve the conditions of operation when the vehicle is stopped, the engine idling, and the user engages a gear in order to move-off.

At the idling speed of the engine, for example 700 r.p.m., the pump 80 delivers very little and the pressure in the space 42 is insufficient to overcome the spring 96. The pump 80 delivers, for example at a pressure of 500 grams into the space 42, the fluid delivered by the pump passing through the orifices 61 and 59 to the chamber 49.

At the moment of engagement of a gear for moving away, any shock which would result from a too abrupt engagement of the clutch is thus avoided. The transmissible torque is in fact reduced since it results from the action of the elastic washer 24 and the very low pressure of 500 grams in the space 42, connected to the chamber 16.

At a speed slightly higher than the idling speed of the engine, for example at 900 r.p.m., the clapper-valve 93 closes and it is the valve 84 which controls the working pressure as previously.

The change from an open position of the valve 93 to a closed position and the change from a position closed to an open position do not take place, all other things being equal, for the same output of the pump, since in the first place a part of the fluid passes through the valve 93 and is removed from the utilization circuit, which does not take place in the second place. Such an asymmetry in the closure and opening makes it possible to avoid that, with the accelerator pedal released, undesired slipping takes place when the speed of the engine falls to the vicinity of the idling speed.

The clapper-valves 93 and 84 may be incorporated in the distributor 33, as has been shown in full lines in FIG. 9, but they may be provided at any other appropriate positions of the circuit, as shown in chain-dotted lines in this figure.

The invention is not limited to the forms of construction described and shown, but includes all its alternative forms.

What we claim is:

1. A transmission control, especially for an automobile vehicle, having an engine and a pump driven at a speed equal or proportional to that of the engine, said control comprising a first pressure level controlled in dependence on the delivery of said pump, a second pressure level lower than the first, and an anti-shock clapper-valve interposed between said first and second pressure levels, said valve being urged in the direction of closure by the difference in pressures on the upstream and downstream sides of said valve in opposition to a spring which urges said valve in the direction of opening and which is calibrated so as to define a value of difference in pressures beyond which said valve is closed and up to which said valve is open, said pump having an output such that when the engine is idling, the pressure-drop between the upstream and downstream sides of said anti-shock clapper-valve is insufficient to cause the closure of said anti-shock valve, said value of difference in pressures corresponding to an engine speed slightly higher than the idling speed, said transmission having hydraulic pressure-sensitive frictional means, whereby, when the engine is rotating faster than the idling speed and when said anti-shock clapper-valve is closed, the clamping and release means are permitted to be subjected to the first said pressure level while when the engine is rotating at idling speed and the anti-shock valve is open, said clamping and release means are permitted to be subjected to said second pressure level.

2. A transmission control as claimed in claim 1, in which a general regulation clapper-valve defines said first pressure level and is urged in the direction of closure by a spring and in the direction of opening by the delivery pressure of said pump.

3. A transmission control as claimed in claim 1, in which said second pressure level is defined by a limiter clapper-valve.

4. A transmission control as claimed in claim 1, in which said second pressure level is defined by the pressure of a tank.

5. A transmission control as claimed in claim 4, in which said tank pressure is atmospheric pressure.

6. A transmission control as claimed in claim 1, in which said transmission has a neutral position, said anti-shock clapper-valve being influenced by the condition of said neutral position.

7. A transmission control as claimed in claim 1, in which said transmission comprises an apparatus such as a torque converter or hydraulic coupler, said apparatus being supplied under said second pressure level.

8. A transmission control as claimed in claim 1, in which said control comprises an apparatus such as a torque converter or hydraulic coupler, said apparatus comprising a clapper-valve known as a converter valve for supplying said apparatus at a pressure less than said first pressure level and different from said second pressure level.

9. A transmission control as claimed in claim 8, in which said second pressure level is defined by a limiter clapper-valve, and in which means are provided for putting out of action one of said limiter and converter valves when it is liable to interfere with the action of the other.

10. A transmission control as claimed in claim 1, in which said transmission comprises, in a chamber filled with oil, a hydraulic torque converter or a coupler, the turbine of which is coupled to at least one pair of plates of at least one clutch which constitutes said clamping and release means, said clutch further comprising a friction disc, said plates having a cylinder-piston relation one with respect to the other so as to define a chamber external to the plates and a chamber internal to the plates, conduits connected to said two chambers and to a distributor associated with said pump and with a tank, the position of said distributor ensuring an application of pressure to the conduit of the external chamber and putting to the tank the internal chamber for the purpose of engagement of the clutch, or putting the conduit of said external chamber to the tank and applying the pressure of the conduit to the internal chamber for the purpose of disengaging the clutch, in which said anti-shock clapper-valve is interposed between said external chamber and said tank.

References Cited

UNITED STATES PATENTS

| 3,228,503 | 1/1966 | Maurice | 192—.096 |
| 3,254,544 | 6/1966 | Maurice et al. | 60—54 XR |
| 3,280,657 | 10/1966 | Holdeman. | |

EDGAR W. GEOGHEGAN, Primary Examiner

U.S. Cl. X.R.

60—54; 74—339; 192—.096